US011923116B2

(12) United States Patent
Omura et al.

(10) Patent No.: US 11,923,116 B2
(45) Date of Patent: Mar. 5, 2024

(54) GRAIN-ORIENTED ELECTRICAL STEEL SHEET AND METHOD OF PRODUCING SAME

(71) Applicant: JFE STEEL CORPORATION, Tokyo (JP)

(72) Inventors: Takeshi Omura, Tokyo (JP); Yoshihisa Ichihara, Tokyo (JP); Kunihiro Senda, Tokyo (JP); Takahiro Koshihara, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 253 days.

(21) Appl. No.: 17/298,672

(22) PCT Filed: Nov. 21, 2019

(86) PCT No.: PCT/JP2019/045645

§ 371 (c)(1),
(2) Date: Jun. 1, 2021

(87) PCT Pub. No.: WO2020/116188

PCT Pub. Date: Jun. 11, 2020

(65) Prior Publication Data

US 2022/0020514 A1 Jan. 20, 2022

(30) Foreign Application Priority Data

Dec. 5, 2018 (JP) ................................ 2018-228380

(51) Int. Cl.
*H01F 1/147* (2006.01)
*C21D 1/34* (2006.01)
(Continued)

(52) U.S. Cl.
CPC ............... *H01F 1/147* (2013.01); *C21D 1/34* (2013.01); *C21D 6/008* (2013.01); *C21D 9/46* (2013.01);
(Continued)

(58) Field of Classification Search
None
See application file for complete search history.

(56) References Cited

U.S. PATENT DOCUMENTS 5,146,063 A * 9/1992 Inokuti ................ C21D 8/1294 219/121.2
6,060,426 A 5/2000 Tan et al.
(Continued)

FOREIGN PATENT DOCUMENTS

EP 0367467 A1 5/1990
JP S5651528 A 5/1981
(Continued)

OTHER PUBLICATIONS

Feb. 18, 2020, International Search Report issued in the International Patent Application No. PCT/JP2019/045645.
(Continued)

*Primary Examiner* — Jenny R Wu
(74) *Attorney, Agent, or Firm* — KENJA IP LAW PC

(57) ABSTRACT

Disclosed is a grain-oriented electrical steel sheet with extremely low iron loss by means of a magnetic domain refining technique. In a grain-oriented electrical steel sheet having a plurality of magnetic domains refined via a local strain introduction portion, when a direct-current external magnetic field is applied to the steel sheet in a rolling direction, for a magnetic flux leaked from the local strain introduction portion at a position 1.0 mm away from a surface of the steel sheet at a side of the local strain introduction portion, a value obtained by dividing an intensity level of a total leakage magnetic flux by an intensity level of a magnetic flux leaked due to causes other than strain is more than 1.2.

10 Claims, 8 Drawing Sheets

(51) Int. Cl.

| | |
|---|---|
| ***C21D 6/00*** | (2006.01) |
| ***C21D 9/46*** | (2006.01) |
| ***C22C 38/00*** | (2006.01) |
| ***C22C 38/04*** | (2006.01) |
| ***C22C 38/06*** | (2006.01) |
| ***C22C 38/22*** | (2006.01) |
| ***C22C 38/34*** | (2006.01) |
| ***C22C 38/60*** | (2006.01) |

(52) U.S. Cl.
CPC .......... *C22C 38/001* (2013.01); *C22C 38/002* (2013.01); *C22C 38/008* (2013.01); *C22C 38/04* (2013.01); *C22C 38/06* (2013.01); *C22C 38/22* (2013.01); *C22C 38/34* (2013.01); *C22C 38/60* (2013.01); *C21D 2201/05* (2013.01); *C22C 2202/02* (2013.01)

(56) References Cited

U.S. PATENT DOCUMENTS

| | | | |
|---|---|---|---|
| 9,330,839 | B2 | 5/2016 | Omura et al. |
| 9,875,832 | B2 | 1/2018 | Yamaguchi et al. |
| 10,559,410 | B2 | 2/2020 | Okabe et al. |
| 2020/0035392 | A1 | 1/2020 | Omura et al. |

FOREIGN PATENT DOCUMENTS

| | | | | |
|---|---|---|---|---|
| JP | S59197525 | A | | 11/1984 |
| JP | S59197525 | A | * | 11/1984 |
| JP | S6249322 | A | | 3/1987 |
| JP | H04202627 | A | | 7/1992 |
| JP | H0543944 | A | * | 2/1993 |
| JP | H0543944 | A | | 2/1993 |
| JP | H05128992 | A | * | 5/1993 |
| JP | H05279744 | A | | 10/1993 |
| JP | H0622179 | B2 | | 3/1994 |
| JP | H11279465 | A | | 10/1999 |
| JP | 2011246782 | A | | 12/2011 |
| JP | 2012052230 | A | | 3/2012 |
| JP | 2015004090 | A | | 1/2015 |
| JP | 2018124266 | A | | 8/2018 |
| KR | 1020180074131 | A | | 7/2018 |
| KR | 1020180074388 | A | | 7/2018 |
| WO | 2013099160 | A1 | | 7/2013 |
| WO | 2013099160 | A8 | | 6/2014 |
| WO | 2018159390 | A1 | | 9/2018 |

OTHER PUBLICATIONS

Dec. 16, 2021, the Extended European Search Report issued by the European Patent Office in the corresponding European Patent Application No. 19893903.5.

* cited by examiner

GRAIN-ORIENTED ELECTRICAL STEEL SHEET AND METHOD OF PRODUCING SAME

TECHNICAL FIELD

This disclosure relates to a grain-oriented electrical steel sheet advantageously utilized for an iron core of a transformer or the like, and to a method of producing the same.

BACKGROUND

Grain oriented electrical steel sheets, which are mainly used as iron cores of transformers, are required to have excellent magnetic properties, in particular, less iron loss. In this regard, it is important to highly accord secondary recrystallized grains of steel sheets with the (110)[001] orientation, or so-called Goss orientation, and reduce impurities in product sheets. Furthermore, since there are limits on controlling crystal grain orientations and reducing impurities, a technique has been developed to introduce magnetic-flux non-uniformity into a surface of a steel sheet by physical means to subdivide the width of a magnetic domain to further reduce iron loss, i.e., a magnetic domain refining technique.

For example, JP H06-22179 B (PTL 1) describes a technique for forming linear grooves, with a groove width of 300 μm or less and a groove depth of 100 μm or less, on one surface of a steel sheet having a thickness of 0.23 mm so as to reduce iron loss $W_{17/50}$ from at least 0.80 W/kg prior to the formation of grooves to 0.70 W/kg or lower.

In addition, JP 2011-246782 A (PTL 2) describes a technique whereby a steel sheet having a thickness of 0.20 mm after being subjected to secondary recrystallization is subjected to plasma arc irradiation to reduce iron loss $W_{17/50}$ from at least 0.80 W/kg prior to the irradiation to 0.65 W/kg or lower.

Furthermore, JP 2012-52230 A (PTL 3) describes a technique for obtaining material for a transformer with low iron loss and low noise by optimizing the coating thickness and the average width of magnetic domain discontinuous portions formed on a surface of a steel sheet by electron beam irradiation.

The magnetic domain refining technique described above uses the anti-magnetic field effect caused by the magnetic poles generated in the vicinity of the strain introduction portion, and JP H11-279645 A (PTL 4) proposes increasing the depth of local strain in the thickness direction for the purpose of increasing the amount of such magnetic poles. In this respect, although various means of increasing the depth in the thickness direction have been proposed, there is a limit to the depth when introducing strain from one side of a steel sheet. In view of this, for example, JP H04-202627 B (PTL 5) proposes a technique of introducing strain from both sides of a steel sheet.

CITATION LIST

Patent Literature

PTL 1: JP H06-22179 B
PTL 2: JP 2011-246782 A
PTL 3: JP 2012-52230 A
PTL 4: JP H11-279645 A
PTL 5: JP H04-202627 B
PTL 6: JP S62-49322 B
PTL 7: WO2013/0099160
PTL 8: JP 2015-4090 A
PTL 9: JP H5-43944 A

SUMMARY

Technical Problem

By applying the technique of PTL 5 described above, the depth of strain introduction is greatly increased and an iron loss improving effect can be obtained accordingly. However, complicated control is required to irradiate a steel sheet at the same position on both sides. In addition, in order to complete irradiation on both front and back surfaces of a steel sheet at the same time with single sheet passage, two sets of electron beam irradiation apparatus are required, leading to an increase in costs. On the other hand, when a single set of irradiation apparatus is installed from the cost perspective, each steel sheet must be passed through the same line twice, resulting in a significant reduction in productivity. Of course, such problems do not occur in the case of introducing strain from one side of a steel sheet. In this case, however, there is a limit to the improvement of iron loss properties when using the technology of increasing the pole generation area by introducing strain from one side of the steel sheet as described in PTL 4. The reality is that it is becoming increasingly difficult to meet the efficiency regulations of transformers, which are expected to be tightened in the future, or to satisfy the properties required by customers.

It would thus be helpful to provide a grain-oriented electrical steel sheet with extremely low iron loss by means of a magnetic domain refining technique.

Solution to Problem

Instead of the conventional idea of “enlarging the magnetic pole generation area to increase the magnetic domain refining effect”, the present inventors examined whether the magnetic domain refining effect could be increased by “increasing the ratio of magnetic poles generated in the same area”. As a result, as a possible measure to change the pole generation ratio, the present inventors came up with the idea of changing the position where the beam diameter is minimized in the thickness direction of the steel sheet by means of focus adjustment. In other words, the strain distribution inside the steel sheet was changed by varying the location where the most energy was concentrated in the thickness direction, and the relationship between the strain distribution and the iron loss was investigated. Specifically, when a grain-oriented electrical steel sheet having a thickness of 0.23 mm (a specimen) was subjected to magnetic domain refining treatment by irradiation with an electron beam, the position where the beam diameter was minimized was displaced in the thickness direction, and the iron loss after the electron beam irradiation was investigated at each position according to the displacement. FIG. 1 illustrates the relationship between the amount of iron loss reduction and the position where the beam diameter was minimized for each specimen.

Within the electron beam irradiation region, the distance from the converging coil of the irradiation device to the steel sheet varies depending on the position in the steel sheet corresponding to the deflection direction of the electron beam. Therefore, when the beam is deflected at a constant converging current value, the position in the thickness direction of the steel sheet where the beam diameter is minimized varies depending on the position in the steel sheet as described above. Here, a dynamic focus function that dynamically changes the focusing current value was introduced to the irradiation device, and the position in the thickness direction of the steel sheet where the beam diameter was minimized (i.e., the focal position) was adjusted to be the same within the range where the beam was deflected. The position in the thickness direction of the steel sheet where the beam diameter was minimized was adjusted by changing the focusing current value. The irradiation conditions other than the focus control parameter (in this case, convergence current value) were not changed, and the accelerating voltage was set at 40 kV, the deflection rate at 24 m/s, the irradiation line interval at 10 mm, and the beam retention interval at 0.32 mm. The deflection pattern of the beam was not in the form of uniform movement at a constant rate, but in the form of a repeating pattern of moving, retaining, moving, and retaining. Therefore, the aforementioned deflection rate was an average value obtained by dividing the distance the beam was moved by the total time it took to move. The beam current was 8 mA, which was most effective in improving the iron loss property under the condition of just focusing on the surface of the steel sheet (at a focal position of 0 mm). The beam diameter at the time of just focusing was 300 μm.

As used herein, the phrase "position where the beam diameter is minimized" refers to a position where the major axis of an ellipse becomes the smallest in the case of the beam diameter being an elliptical beam diameter.

Conventionally, it is common to adjust the focus of electron beam such that it is just focused (the beam diameter is minimized) on the surface of the steel sheet. As illustrated in FIG. 1, when the position in the thickness direction of a steel sheet where the beam diameter is minimized is above and away from the surface of the steel sheet (this state will be hereinafter also referred to as "upper focus", corresponding to negative positions in FIG. 1), the amount of iron loss reduction is reduced compared to the case where the beam is just focused on the surface of the steel sheet (corresponding to the position of 0 mm in FIG. 1). On the other hand, if the position where the beam diameter is minimized is located inside the surface of the steel sheet (this state will be hereinafter referred to as "under focus", corresponding to positive positions in FIG. 1), it was found that the amount of iron loss reduction increases when the position is located inside the steel sheet in the thickness direction, i.e., when it is located at a position more than 0 mm and less than 0.23 mm in the case of FIG. 1. Note that when the electron beam was further defocused to a positive position by a distance larger than the sheet thickness, the amount of iron loss reduction decreased.

In addition, for the samples where the amount of iron loss reduction was greater than that in the case where the just focus was on the surface of the steel sheet, observation was made to examine the closure domains that extend linearly across the main magnetic domains along the direction of electron beam irradiation. In other words, the shape of cross-sectional closure domains was observed under a Kerr effect microscope, and the depth and width of the closure domains were measured. At this time, the (100) plane of the crystal was set at the observation plane. This is because if the observation plane is shifted from the (100) plane, another magnetic domain structure tends to appear as a result of surface magnetic poles being generated on the observation plane, making it difficult to observe the desired closure domains.

Our observations revealed that the depth and width of closure domains were almost the same as those of a sample with just focusing on the surface of the steel sheet. This result implies that the volume of introduced strain was almost the same. Although the cause of the increase in the amount of iron loss reduction in the samples under-focused within the above range is not clear, the present inventors believe that it may be due to the change in strain distribution in the same volume of the steel sheet as a result of setting the position where energy is concentrated at a position inside the surface of the steel sheet.

According to conventional techniques using closure domains, it was not possible to determine the steel sheet with an improved iron loss property on the basis of the position where the beam diameter was minimized. Thus, the present inventors analyzed the strain distribution on the basis of leakage magnetic flux as a new measure to determine the steel sheet with an improved iron loss property. In other words, the inventors investigated the magnetic flux leaking from the aforementioned local strain introduction portion when applying "a direct-current external magnetic field in magnitude such that it allows magnetic domain walls of those magnetic domains in a region with no local strain introduction portion to move, while not allowing the magnetization direction of other magnetic domains in a region with a local strain introduction portion to be parallel to the direction of the easy magnetization axis".

In this case, the strain distribution analysis was performed on the basis of leakage magnetic flux for the following reasons. If a strain introduction portion is considered as a local magnetic discontinuity, there should be magnetic flux leakage due to such strain introduction, and it is believed that the strain distribution in a local strain introduction portion can be evaluated by measuring the leakage magnetic flux.

As a condition for measuring the magnetic flux leakage due to the introduction of strain, it is preferable to use an external magnetic field level in the direction of the easy magnetization axis such that it allows the magnetic domain walls of magnetic domains whose magnetization direction is parallel to the easy magnetization axis to move, while not allowing the magnetization direction of other magnetic domains in the local strain introduction portion to be parallel to the easy magnetization axis. Note that the direction of the easy magnetization axis is usually parallel to the rolling direction of the steel sheet. Under these conditions, the difference between the amount of leakage magnetic flux generated due to strain and the amount of leakage magnetic flux generated due to other causes in the local strain introduction portion (or, the ratio of leakage magnetic flux generated due to strain to the total leakage magnetic flux generated in the local strain introduction portion) becomes large, and the evaluation of the strain distribution state on the basis of leakage magnetic flux can be performed accurately.

On the other hand, if the external magnetic field level is higher than the aforementioned range, almost all the magnetic domains, including those in the local strain introduction portion, will accord with the direction of the easy magnetization axis. That is, the discontinuity due to strain will be eliminated, and the amount or ratio of leakage magnetic flux due to strain will be greatly reduced, making it difficult to accurately evaluate the signal indicative of the amount of leakage magnetic flux due to strain introduction. On the other hand, if the external magnetic field level is lowered excessively, the amount of leakage magnetic flux generated due to causes other than strain will decrease, but the amount of leakage magnetic flux caused by the introduction of strain will also decrease, making it difficult to perform evaluation with good accuracy.

For the above reasons, the present inventors decided to measure the leakage magnetic flux under "the condition where the ratio of the leakage magnetic flux caused by strain is the largest in the local strain introduction portion, because the external magnetic field level used allows the magnetic domain walls of magnetic domains whose magnetization direction is parallel to the easy magnetization axis to move, but does not allow the magnetization direction of magnetic domains in the local strain introduction portion to be parallel to the easy magnetization axis". Then, various examinations were carried out on "the condition where the ratio of the leakage magnetic flux caused by strain is the largest", and the following was confirmed. Specifically, measurement is first made of a magnetic flux signal (intensity level of the total leakage magnetic flux) in the portion where strain has been introduced while varying the direct-current magnetic field; then, stress relief annealing is performed to remove the introduced strain, and measurement is made of a magnetic flux signal (intensity level of the leakage magnetic flux generated due to causes other than strain) in the region from which strain has been removed while varying the direct-current magnetic field again; and then the signal intensity ratio of the magnetic flux before and after the removal of strain (before removal/after removal) is calculated. The condition where the magnetic flux signal ratio (signal intensity ratio) is the largest represents the condition where the ratio of the intensity level of the leakage magnetic flux caused by strain to the intensity level of the total leakage magnetic flux in the local strain introduction portion is the largest. It was thus confirmed that under this condition, the leakage magnetic flux caused by strain can be evaluated with the highest accuracy.

The above condition, in other words, can also be considered as the condition in which the ratio of the intensity level of the total leakage magnetic flux to the intensity level of the leakage magnetic flux generated due to causes other than strain is the largest in the local strain introduction portion.

As a result, the inventors came up with the idea of using the signal intensity ratio as an index under the condition in which the ratio of the level of the leakage magnetic flux generated due to strain to the level of the total leakage magnetic flux generated in the local strain introduction portion is the largest at a position 1.0 mm away from a surface of the steel sheet at a side of the local strain introduction portion.

The following describes a specific example for determining the above-described signal intensity level.

Specifically, external magnetic fields of 10 AT to 1000 AT were applied in the rolling direction of the grain-oriented electrical steel sheets to which local strain had been introduced. Then, the leakage magnetic flux was measured using a magnetoresistive-type high-sensitivity sensor (Micro Magnetics STJ-240IC) placed at a distance of 1.0 mm from a surface of each steel sheet, while moving a magnetizer and a magnetic sensor relative to the steel sheet for scanning at a rate of 10 mm/s and a sampling frequency of 100 Hz.

The measuring area here ranged from 200 mm in the rolling direction (RD) to 80 mm in the transverse direction (TD) (direction orthogonal to the rolling direction). The sampling pitch was 2000 points at 0.1 mm pitch in the rolling direction and 81 points at 1 mm pitch in the transverse direction. A 1 Hz high-pass filter and a 10 Hz low-pass filter were used, and an amplifier was used to amplify signals by a factor of 1000.

The obtained measurement results of leakage magnetic flux were subjected to FFT calculation in the direction of the easy magnetization axis, and the complex number in the FFT calculation result was taken as the absolute value, and the value obtained by dividing this absolute value by 1024 was taken as the signal intensity level.

Since there were only 2000 data points, 0 was entered for the 48 points for which data was unavailable for the FFT calculation. Since 81 lines were measured in the TD direction, the average value obtained from the measurement results of all the lines was used as the final signal intensity level of the leakage magnetic flux. The frequency on the horizontal axis was converted to wavelength (scan rate/FFT frequency in mm).

In other words, the signal intensity level of FFT is expressed in a way that varies with wavelength, and the signal intensity level that peaks at the wavelength corresponding to the beam irradiation line interval is defined as the "intensity level of the leakage magnetic flux" in this disclosure. Since the magnetic flux is difficult to pass through the electron beam irradiation portion (local strain introduction portion) due to the effect of strain, the signal intensity level of the leakage magnetic flux is increased in the local strain introduction portion.

FIG. 2A illustrates a measurement result of the intensity level of the leakage magnetic flux for a sample irradiated with electron beam at a line interval of 5 mm. It can be seen from FIG. 2A that a peak A appears around the line interval (wavelength) of 5 mm. The leakage magnetic flux in the range where the local strain has been introduced includes both the leakage magnetic flux caused by strain and the leakage magnetic flux caused by other sources. As mentioned above, when 0 is entered for the 48 points for which data is unavailable, the peak will not appear at exactly 5 mm. Accordingly, a peak A near 5 mm can be determined as the peak resulting from the local strain introduction portion. Eventually, if the peak around 5 mm disappears when the same measurement is made after stress relief annealing, then this peak A can be considered as the peak resulting from the local strain introduction portion. The measurement results of the intensity of the leakage magnetic flux after stress relief annealing are illustrated in FIG. 2B. Since the peak disappears from around the wavelength of 5 mm in FIG. 2B, it can be concluded that the peak A observed around the wavelength of 5 mm in FIG. 2A was indicative of a strain-induced leakage magnetic flux. Note that a signal intensity level B after the stress relief annealing at the wavelength position where the peak A was observed before the stress relief annealing represents the intensity level of the magnetic flux that leaked due to causes other than strain.

FIG. 3 illustrates an example of the relationship between the external magnetic field and the intensity level ratio of leakage magnetic flux, A/B (the signal intensity level of the total leakage magnetic flux before stress relief annealing, A/the signal intensity level of the magnetic flux leaked due to causes other than strain after stress relief annealing, B, which ratio will be hereinafter referred to simply as the "signal intensity ratio"). From FIG. 3, it was confirmed that the signal intensity ratio A/B was maximum near the external magnetic field of 200 AT for all the samples. Therefore, the relationship between the state of the strain introduced into the steel sheet and the iron loss was evaluated here using data obtained by applying an external magnetic field of 200 AT.

Furthermore, FIG. 4 illustrates the relationship between the amount of iron loss reduction and the signal intensity ratio A/B illustrated in FIG. 3 for the position where the electron beam diameter is minimized. As for the intensity level of magnetic flux leaked due to causes other than strain, signal measurement and analysis were performed again after annealing at 800° C. for 3 hours in an Ar atmosphere to remove strain, and the signal intensity level at the wavelength corresponding to the beam irradiation line interval was used. As illustrated in FIG. 4, a very close correlation was identified between the signal intensity ratio A/B (triangular plots in the figure) and the amount of iron loss reduction (circular plots in the figure) before and after stress relief annealing at the wavelength corresponding to the irradiation line interval. In particular, as can be seen from FIG. 5, which presents the details of the signal intensity ratio A/B and the amount of iron loss reduction around a position of 0 mm where the electron beam diameter is minimized, it was found that by processing at a position where the signal intensity ratio exceeds 1.2, the iron loss can be reduced more than that in conventional processing at a just focus position (where the beam diameter is minimized at the position of 0 mm).

In the present disclosure, since the strain distribution is specified by the signal intensity ratio A/B, the following procedure is applicable to measurement, for example, and the detailed measurement conditions are arbitrary.

i) Apply a direct-current magnetic field and measure the leakage magnetic flux using a magnetoresistive sensor.
ii) Calculate the amplitude of the measured leakage magnetic flux by FFT in the direction of the easy magnetization axis.
iii) Convert frequency to wavelength.
iv) Perform evaluation using the signal intensity level (amplitude) that peaks at the wavelength corresponding to the irradiation line interval.

As for the positions away from the surface of the steel sheet, evaluation is possible even if the distance is not 1.0 mm, but the sensitivity of the sensor decreases as the distance from the surface of the steel sheet increases, and the distance control becomes difficult as the distance from the surface of the steel sheet becomes smaller. Therefore, the distance of 1.0 mm was used for evaluation. Although it is possible to evaluate the results even under the condition in which the ratio of the magnetic flux signal that reflects the state of strain introduction to the magnetic flux noise that does not reflect the state of strain introduction is not the largest, the measurement accuracy would be reduced. Thus, from the viewpoint of improving the measurement accuracy, the condition in which the ratio is the largest was selected.

Next, FIG. 6 illustrates the results obtained by the same method as in FIG. 1 above, when the magnetic domain refining treatment was performed by laser beam irradiation. Note that the position of the focal position of the laser beam was changed by adjusting the distance between the laser condenser lens and the steel sheet. The laser used was a single-mode fiber laser, with a scanning rate of 10 m/s and an irradiation line interval of 10 mm. The beam diameter at the just focus position was 50 μm. The output power of the laser beam was varied, and the laser beam of 100 W, which had the highest iron loss reduction effect under the condition that the laser beam was just focused on the surface of the steel sheet, was used.

When a local strain introduction portion was formed by laser beam irradiation, the same tendency as that by electron beam irradiation was observed. In other words, when the position where the beam diameter was minimized was shifted above the surface of the steel sheet (in an upper focus state), the amount of iron loss reduction was reduced compared to the case of the position of 0 mm at which the beam was adjusted to be just focused on the surface of the steel sheet. On the other hand, when the position where the beam diameter was minimized was located inside the surface of the steel sheet (in an under focus state), the amount of iron loss reduction increased when the position was located inside the steel sheet in the thickness direction, i.e., at a position of more than 0 mm and less than 0.23 mm in the case of FIG. 6, and decreased when the laser beam was further defocused to a positive position by a distance larger than the sheet thickness. However, the absolute value of the amount of iron loss reduction confirmed within the range where the laser beam diameter was minimized at a position of more than 0 mm and less than 0.23 mm was smaller than that using electron beam irradiation. Although the mechanism of this phenomenon is not clear, the present inventors consider that the penetration ability into steel sheets differs greatly between electron beam and laser beam, the former, electron beam, has a higher penetration ability, and thus the electron beam irradiation might change the strain distribution to a greater extent.

The present disclosure is based on the above discoveries, and primary features thereof are as follows.

1. A grain-oriented electrical steel sheet comprising a plurality of magnetic domains refined via a local strain introduction portion, wherein when a direct-current external magnetic field is applied to the steel sheet in a rolling direction, for a magnetic flux leaked from the local strain introduction portion at a position 1.0 mm away from a surface of the steel sheet at a side of the local strain introduction portion, a value obtained by dividing an intensity level of a total leakage magnetic flux by an intensity level of a magnetic flux leaked due to causes other than strain is more than 1.2.
2. The grain-oriented electrical steel sheet according to 1., wherein a magnetic flux density $B_8$ is 1.94 T or more.
3. A method of producing the grain-oriented electrical steel sheet as recited in 1. or 2., comprising: subjecting a grain-oriented electrical steel sheet to final annealing; and then applying magnetic domain refining treatment to a surface of the steel sheet by irradiation with an electron beam while adjusting focusing of the electron beam such that a position where a beam diameter of the electron beam is minimized over an entire irradiation width is located inside the surface of the steel sheet.
4. A method of producing the grain-oriented electrical steel sheet as recited in 1. or 2., comprising: subjecting a grain-oriented electrical steel sheet to final annealing; and then applying magnetic domain refining treatment to a surface of the steel sheet by irradiation with a laser beam while adjusting focusing of the laser beam such that a position where a beam diameter of the laser beam is minimized over an entire irradiation width is located inside the surface of the steel sheet.
5. The method of producing the grain-oriented electrical steel sheet according to 3. or 4., wherein the position where the beam diameter is minimized is set in a region from inside the surface of the steel sheet at the side of the local strain introduction portion to a mid-thickness part.

Advantageous Effect

According to the present disclosure, by properly controlling the signal intensity ratio obtained by measuring the leakage magnetic flux, a higher magnetic domain refining effect can be obtained, making it possible to produce a grain-oriented electrical steel sheet with lower iron loss. Therefore, transformers using such grain-oriented electrical steel sheets as iron cores can achieve high energy use efficiency and are therefore useful in industry.

DETAILED DESCRIPTION

Figure 1:
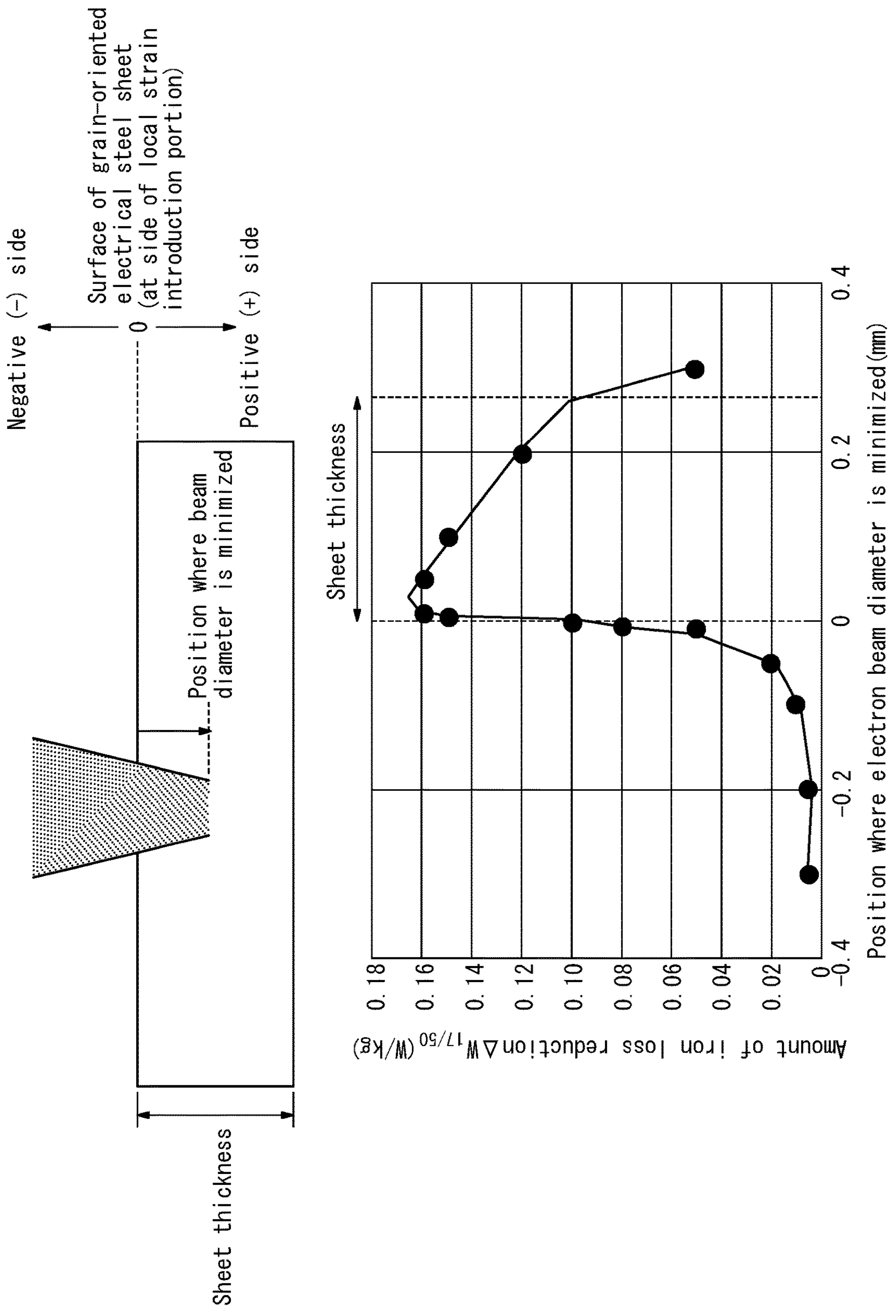
FIG. 1 is a graph illustrating an example of the relationship between the amount of iron loss reduction and the position where the electron beam diameter is minimized.
Figure 2A:
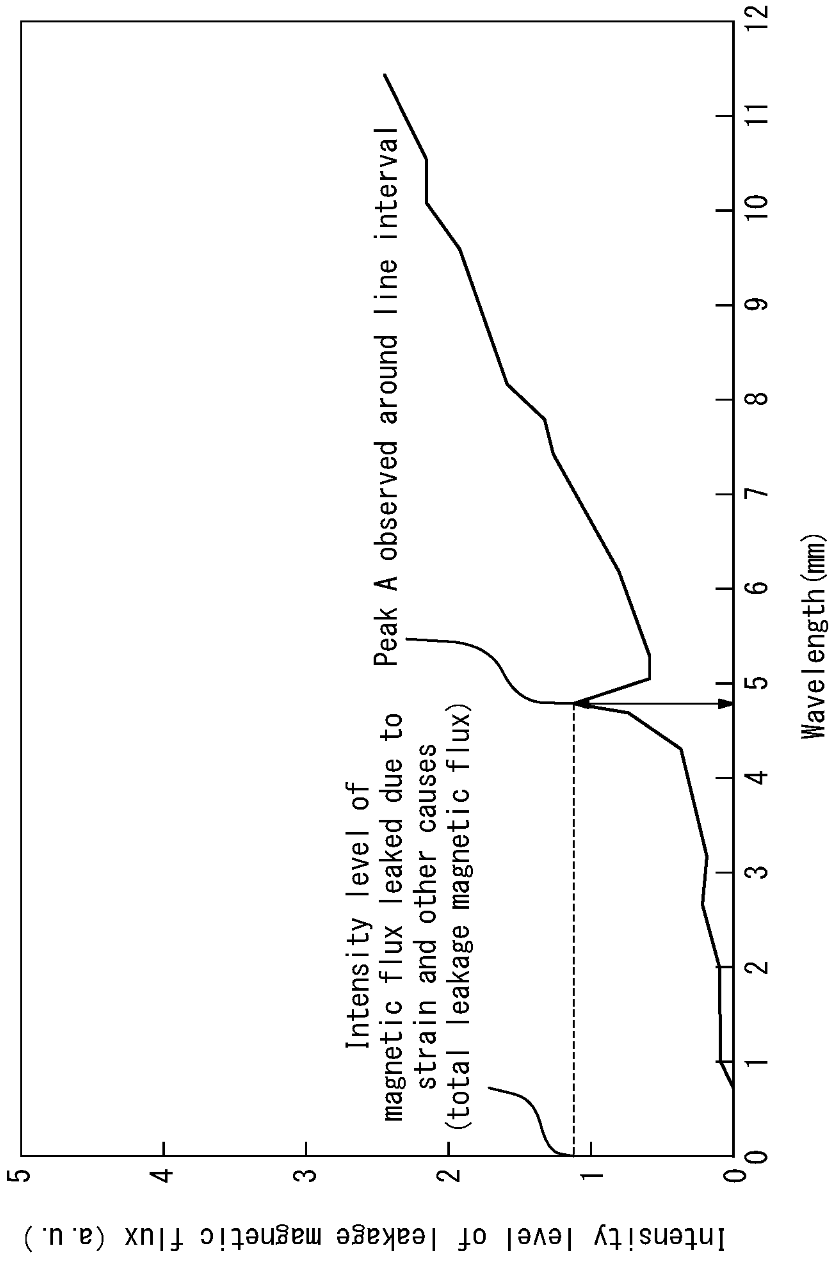
FIG. 2A is a graph illustrating an exemplary measurement result of leakage magnetic flux before stress relief annealing.
Figure 2B:
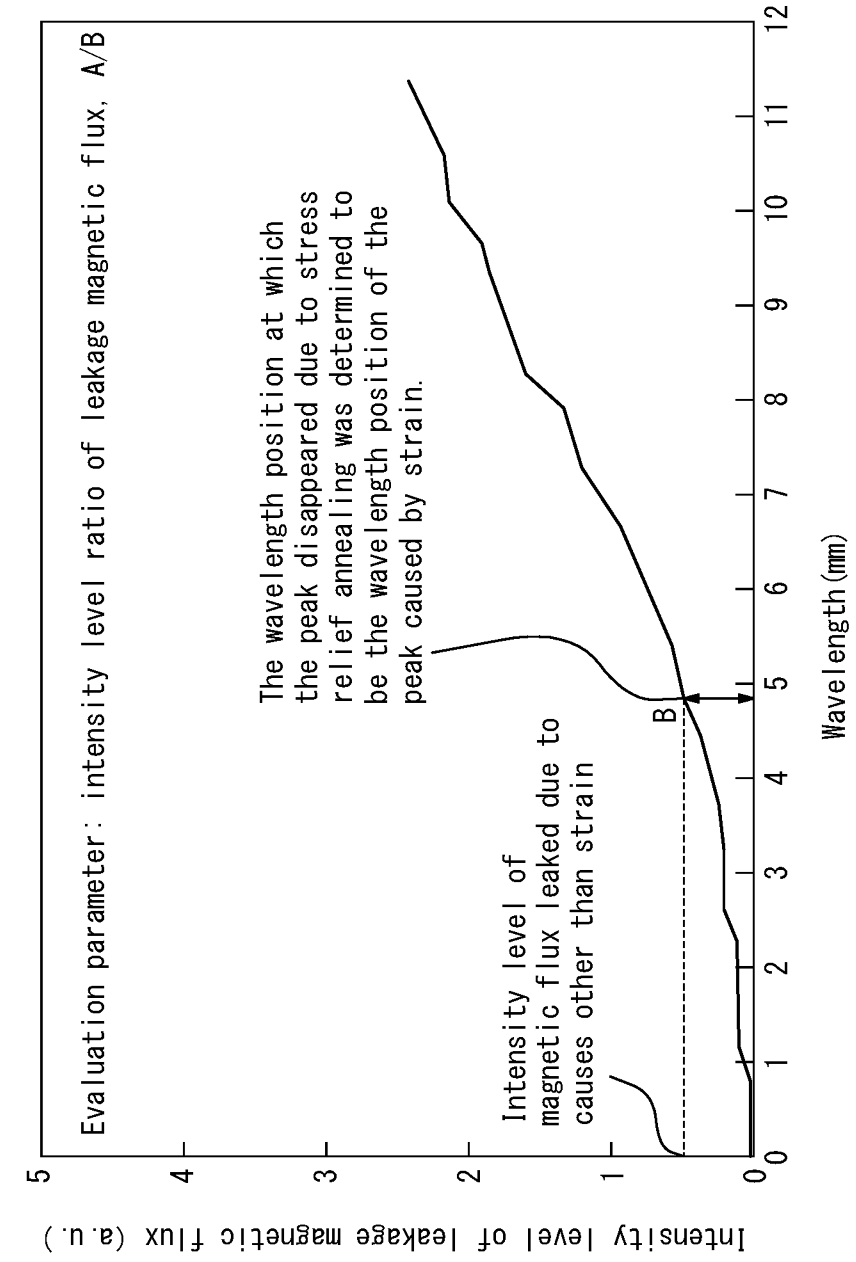
FIG. 2B is a graph illustrating an exemplary measurement result of leakage magnetic flux after stress relief annealing.
Figure 3:
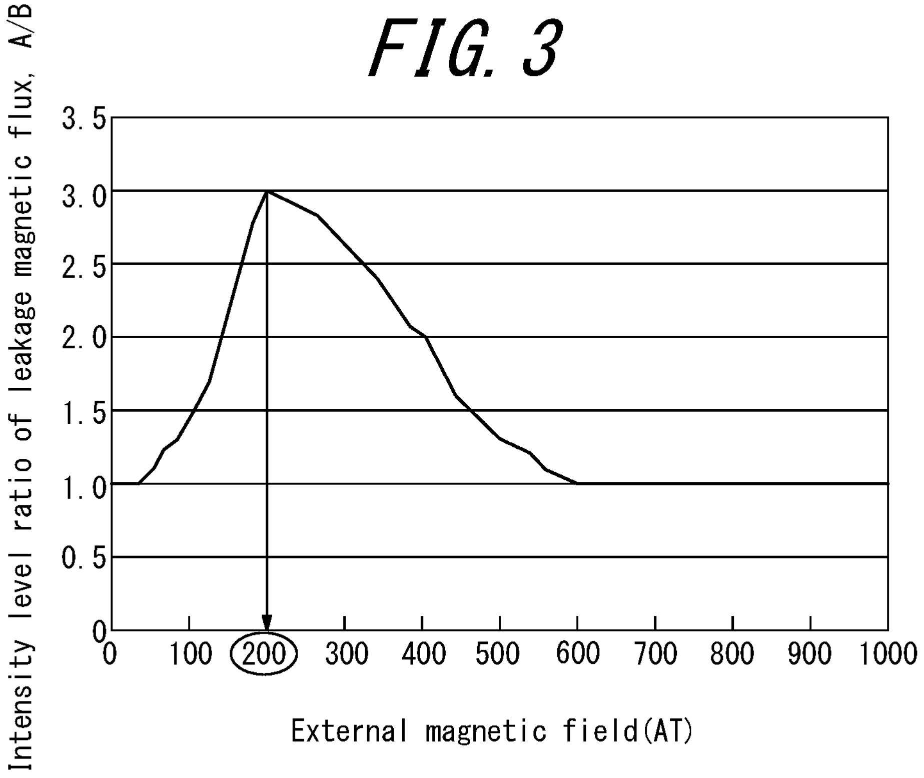
FIG. 3 is a graph illustrating an example of the relationship between the external magnetic field and the intensity level ratio of leakage magnetic flux.
Figure 4:
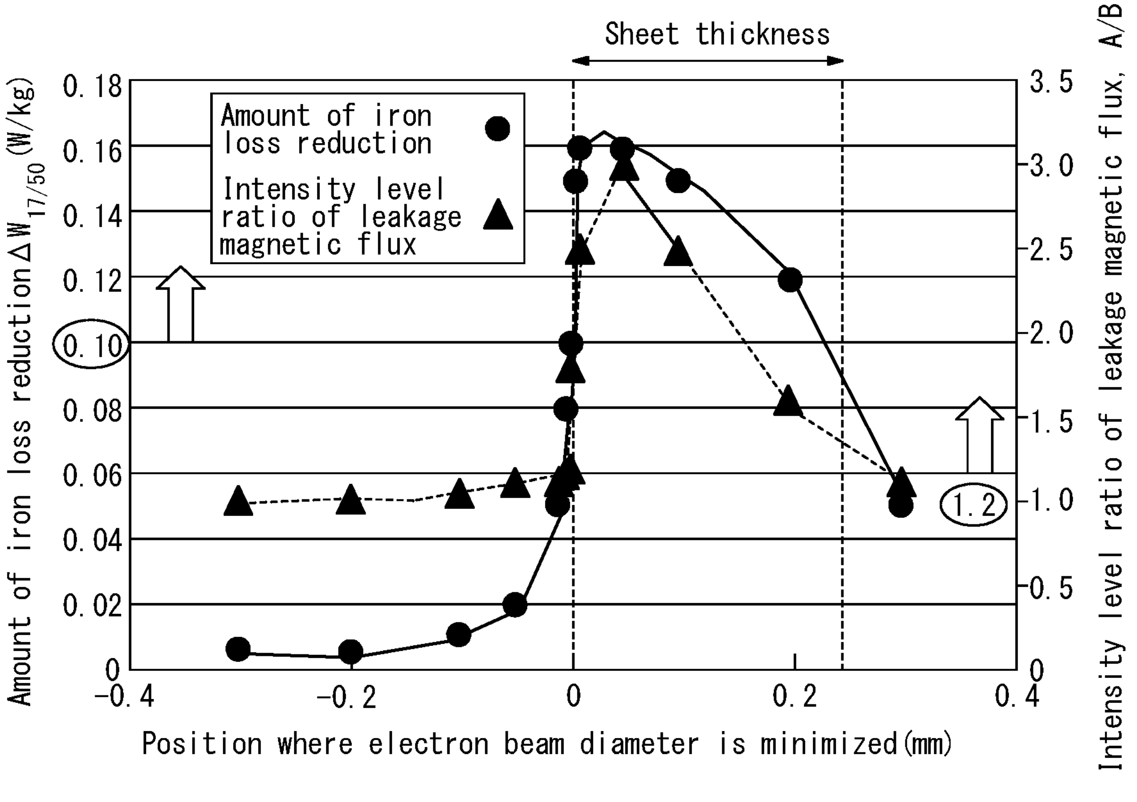
FIG. 4 is a graph illustrating an example of the relationship between the amount of iron loss reduction and the intensity level ratio of leakage magnetic flux for the position where the electron beam diameter is minimized.
Figure 5:
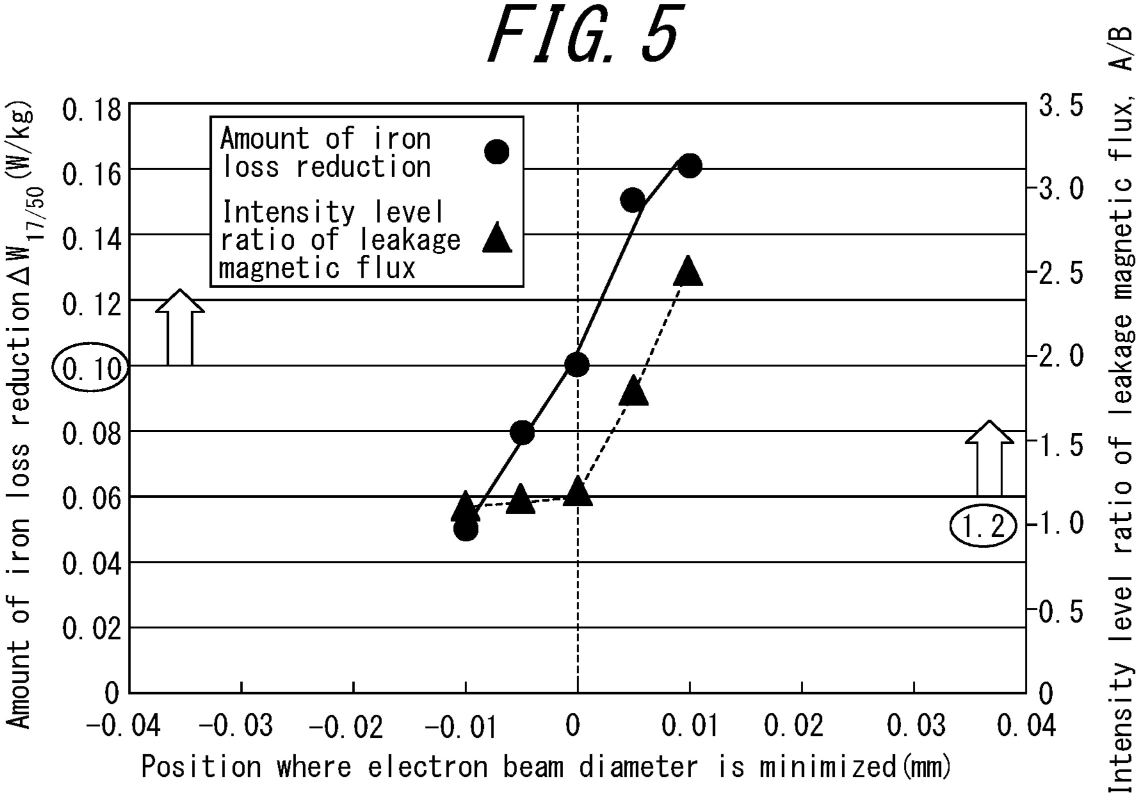
FIG. 5 is a graph illustrating the details of the intensity level ratio of leakage magnetic flux and the amount of iron loss reduction around a position of 0 mm where the electron beam diameter is minimized.
Figure 6:
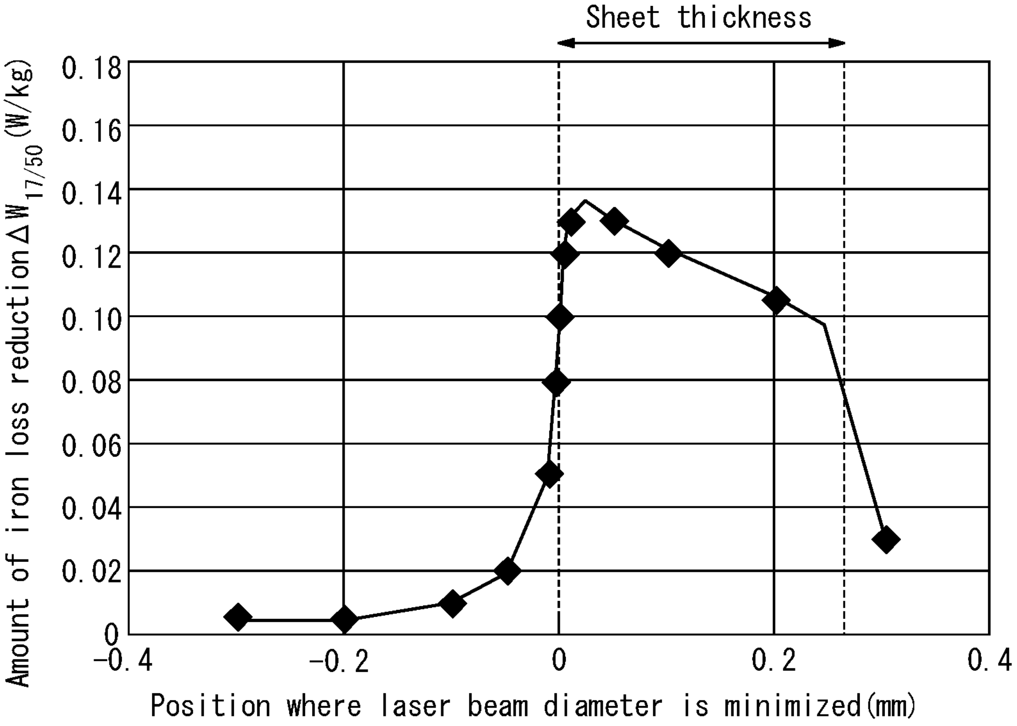
FIG. 6 is a graph illustrating an example of the relationship between the amount of iron loss reduction and the position where the laser beam diameter is minimized.

Hereinafter, a grain-oriented electrical steel sheet and a method of producing the same according to the present disclosure will be specifically described.

[Grain-Oriented Electrical Steel Sheet]

The grain-oriented electrical steel sheet disclosed herein comprises a plurality of magnetic domains refined via a local strain introduction portion. Here, when a direct-current external magnetic field is applied in the rolling direction of the grain-oriented electrical steel sheet disclosed herein, magnetic flux leaks from the local strain introduction portion. For the leakage magnetic flux, at a position 1.0 mm away from a surface of the steel sheet at a side of the local strain introduction portion, a value obtained by dividing an intensity level of a total leakage magnetic flux by an intensity level of a magnetic flux leaked due to causes other than strain may be more than 1.2. The grain-oriented electrical steel sheet disclosed herein can be obtained, by, for example, a method for producing the grain-oriented electrical steel sheet according to the present disclosure.

The type of grain-oriented electrical steel sheet to be subjected to magnetic domain refining treatment is not particularly limited. Any of the conventionally known grain-oriented electrical steel sheets can be suitably used, for example, with or without the use of inhibitor components. The steel sheet may be coated with an insulating film or may not be coated therewith without any problem. However, from the viewpoint of iron loss reduction, it is preferable to use a steel sheet having a chemical composition containing Si in a range of 2.0 mass % to 8.0 mass %. In addition, from the viewpoint of sheet passage performance, it is more preferable to use a steel sheet having a chemical composition containing Si in a range of 2.5 mass % to 4.5 mass %. In industrial terms, it is preferable that the thickness of the grain-oriented electrical steel sheet is 0.10 mm or more. It is preferably 0.35 mm or less. It is preferably set in a range of about 0.10 mm to about 0.35 mm.

In addition, for steel sheets with wider magnetic domains before subjection to the magnetic domain refining treatment, more magnetic poles need to be generated to refine the magnetic domains, and the conventional technology may not be effective enough to improve the iron loss property. Therefore, for example, the effect of further iron loss reduction by applying the method according to the present disclosure is greater when a steel sheet with wider magnetic domains before subjection to the magnetic domain refining treatment is used. A wider magnetic domain before the magnetic domain refining treatment is translated into a higher magnetic flux density, and the method disclosed herein is more suitable to be applied to steel sheets with a magnetic flux density $B_8$ of 1.94 T or higher.

[Method of Producing the Grain-Oriented Electrical Steel Sheet]

The method of producing the grain-oriented electrical steel sheet disclosed herein is a method of producing the above-described grain-oriented electrical steel sheet, which comprises the same features as those described above for the grain-oriented electrical steel sheet disclosed herein. The method of producing the grain-oriented electrical steel sheet comprises: subjecting the grain-oriented electrical steel sheet to final annealing; and then applying magnetic domain refining treatment to a surface thereof by irradiation with an electron beam or laser beam. In the magnetic domain refining treatment, focusing of the beam is adjusted such that a position where a beam diameter is minimized over an entire irradiation width is located inside the surface of the steel sheet.

[Local Strain Introduction]

Local strain introduction can be applied by a method using an electron beam or laser beam. However, it is more preferable to use an electron beam that had a higher effect on iron loss reduction, etc., as demonstrated in the experiments conducted by the inventors described above. In forming a local strain introduction portion, it is important to set the position (focal position) where the beam diameter is minimized over the entire irradiation width inside the surface of the steel sheet. More preferably, this focal position is adjusted to a position from inside the surface (irradiation surface) of the steel sheet at the side of the local strain introduction portion to a mid-thickness part. There is no particular limitation on the way of focal position adjustment, yet in the case of electron beam irradiation, it is preferable to apply dynamic focus control and adjust the focusing current. In the case of laser irradiation, it is preferable to adjust the height of the laser condenser lens (i.e., the distance from the surface of the steel sheet). Although the reason why setting the focal position inside the surface of the steel sheet improves the iron loss reducing effect is uncertain, the inventors believe that it may be because the strain distribution inside the steel sheet in the local strain introduction portion changes even if the volume of closure domains (the volume of the local strain introduction portion) is the same, and as a result, the ratio of magnetic poles generated increases. Although conditions other than the above for magnetic domain refining treatment are not particularly limited, the irradiation direction is preferably a direction that crosses the rolling direction of the steel sheet, more preferably a direction of 60° to 90° relative to the rolling direction, and even more preferably a direction of 90° relative to the rolling direction (i.e., the transverse direction). The irradiation interval is preferably 3 mm or more in the rolling direction. It is preferably 15 mm or less in the rolling direction. It is more preferably in a range of about 3 mm to about 15 mm. When an electron beam is used, the accelerating voltage is preferably 10 kV or higher. It is preferably 200 kV or lower. It is more preferably in a range of 10 kV to 200 kV. The beam current is preferably 0.1 mA or higher. It is preferably 100 mA or lower. It is more preferably in a range of 0.1 mA to 100 mA. The beam diameter is preferably 0.01 mm or more. It is preferably 0.3 mm or less. It is more preferably in a range of 0.01 mm to 0.3 mm. When a laser beam is used, the amount of heat per unit length is preferably 5 J/m or more. It is preferably 100 J/m or less. It is more preferably in a range of about 5 J/m to about 100 J/m. The spot diameter is preferably 0.01 mm or more. It is preferably 0.3 mm or less. It is more preferably in a range of about 0.01 mm to about 0.3 mm.

Controlling the focal position to a predetermined position, which is a feature of the production method disclosed herein, means that the focal position is defocused from the surface of the steel sheet. For defocusing, several techniques have been reported in, for example, JPS62-49322B (PTL 6), WO2013/0099160 (PTL 7), JP2015-4090A (PTL 8), and JPH5-43944A (PTL 9). Now, the difference between these techniques and the present disclosure is described.

First, PTL 9 describes a magnetic domain refining technique using an electron beam, in which the focal position is set farther away from the surface of the steel sheet without applying dynamic focusing technology. In some of the examples in PTL 9, the focal position is set outside, rather than inside, the steel sheet, which is clearly different from the present disclosure.

Also, PTL 6 describes a laser-based magnetic domain refining technique that suppresses peeling of coating through defocusing. Defocusing on the under-focus side is important in the present disclosure, but PTL 6 does not distinguish between upper focus and under focus, and does not suggest that there is a small region on the under-focus side where iron loss could be further reduced. In addition, the technology in PTL 6 is aimed at reducing the amount of strain introduced to minimize the degradation of iron loss properties while reducing the damage to the coating, but is not intended to further reduce iron loss.

Furthermore, the technologies described in PTLs 7 and 8 are aimed at improving the noise properties and building factors of transformers, and do not focus on further reducing the material iron loss, which is an object of the present disclosure. The examples of PTLs 7 and 8 do not distinguish between upper focus and under focus, and there is no specific statement regarding the degree of defocus.

[Evaluation Parameters for the Local Strain Introduction Portion]

The evaluation of the depth and width of closure domains used in conventional strain evaluation cannot evaluate the intended strain distribution state of the grain-oriented electrical steel sheet disclosed herein. To identify the strain state in the grain-oriented electrical steel sheet disclosed herein, the evaluation method using the leakage magnetic flux described above is effective. Specifically, this method uses a magnetic sensor to measure the magnetic flux that is caused to leak above the surface of the steel sheet due to the fact that the magnetic flux that has been passed inside the steel sheet using a magnetizer is difficult to pass through the steel sheet due to strain. The measurement data was subjected to FFT in the direction of the easy magnetization axis, and the absolute value of the complex number of the FFT result was used as the signal intensity level of the leakage magnetic flux (intensity level of the total leakage magnetic flux). This signal intensity level includes not only the leakage magnetic flux due to strain, but also the leakage magnetic flux due to other factors. Therefore, for the strain evaluation, the signal intensity ratio (the ratio of the intensity level of the total leakage magnetic flux to the intensity level of the magnetic flux leaked due to causes other than strain) is used, rather than the above signal intensity level itself. As mentioned above, very good iron loss properties can be obtained when the obtained signal intensity ratio (ratio of the intensity levels of the leakage magnetic flux) is more than 1.2. Preferably, the signal intensity ratio is 2.5 times or more, 3.0 times or more, or 4.0 times or more.

EXAMPLES

Example 1

The present disclosure will be described in more detail below. The following examples merely represent preferred examples, and the present disclosure is not limited to these examples. Embodiments of the present disclosure may be changed appropriately within the range conforming to the purpose of the disclosure, all of such changes being included within the technical scope of the disclosure.

Steel slabs (Steel Nos. A and B) containing the components listed in Table 1 with the balance being Fe and inevitable impurities were prepared by continuous casting, heated to 1400° C., and hot rolled to obtain a hot-rolled sheet having a thickness of 2.6 mm, and then subjected to hot-rolled sheet annealing at 950° C. for 10 seconds. Then, each resulting sheet was cold rolled to an intermediate thickness of 0.80 mm, and intermediate annealing was carried out under a set of conditions including an oxidation degree of $PH_2O/PH_2=0.35$, a temperature of 1070° C., and a duration of 200 seconds. Thereafter, the subscale on the surface was removed by pickling with hydrochloric acid, and then cold rolling was performed again to produce a cold-rolled sheet having a thickness of 0.22 mm.

Each cold-rolled sheet was then subjected to decarburization annealing in which it was held at a soaking temperature of 860° C. for 30 seconds, then applied with an annealing separator mainly composed of MgO, and then subjected to final annealing at 1220° C. for 20 hours intended for secondary recrystallization, forsterite film formation, and purification. After removing any unreacted annealing separator, a coating liquid containing 50% of colloidal silica and aluminum phosphate was applied, and tension coating baking treatment (baking temperature: 850° C.) also serving as flattening annealing was performed. Then, magnetic domain refining treatment was performed on one surface of each steel sheet, where the surface was irradiated with an electron beam or laser beam in a direction perpendicular to the rolling direction. The irradiation conditions of the electron beam and laser beam were adjusted as in Table 2, and the position where the beam diameter was minimized over the entire irradiation width was also adjusted as in Table 2.

The evaluation results for iron loss, magnetic flux density, and signal intensity ratio (the value obtained by dividing the intensity level of the total leakage magnetic flux by the intensity level of the magnetic flux leaked due to causes other than strain for the magnetic flux leaked from the local strain introduction portion) are listed in Table 2. With reference to Table 2, comparing between Condition Nos. 4 to 8 with Nos. 14 to 18 and between Condition Nos. 24 to 28 with Nos. 34 to 38, it can be seen that the improvement in the iron loss property at the same focal position was much larger than that at the focal position of 0 mm when grain-oriented electrical steel sheets with a higher magnetic flux density were used, regardless of the strain introduction method.

Comparing between Condition Nos. 4, 5, 6, 7 (Steel No. A) and Nos. 14, 15, 16, 17 (Steel No. B) where electron beam irradiation was performed with Condition Nos. 24, 25, 26, 27 (Steel No. A) and Nos. 34, 35, 36, 37 (Steel No. B) where laser beam irradiation was performed for each steel grade, it can be seen that for the same steel grade, the signal intensity ratio was larger in the samples with electron beam irradiation and the iron loss reducing effect was also larger in these samples, although both of the electron beam and laser beam conditions are within the scope of the present disclosure. In contrast, for the comparative examples outside the scope of the present disclosure in which the focal position was set on the irradiation surface (i.e., the focal position was set at 0 mm), it can be seen that the iron loss was larger than our examples.

TABLE 1

| Steel sample | Chemical composition (mass %) | | | | | | | | | | | | | |
|---|---|---|---|---|---|---|---|---|---|---|---|---|---|---|
| No. | C | Si | Mn | Ni | Cr | P | Mo | Sb | Sn | Al | N | Se | S | O |
| A | 0.03 | 2.8 | 0.010 | 0.01 | 0.01 | 0.01 | 0.001 | 0.020 | 0.001 | 0.025 | 0.0050 | 0.001 | 0.004 | 0.0010 |
| B | 0.07 | 3.4 | 0.030 | 0.07 | 0.05 | 0.05 | 0.010 | 0.001 | 0.04 | 0.028 | 0.0038 | 0.012 | 0.001 | 0.0013 |

TABLE 2

| Condition No. | Steel sample No. | Strain introduction means | Irradiation interval in rolling direction (mm) | Beam output (W) | Beam scanning rate (m/s) | Focal position (mm) with reference to irradiation surface (−: upper focus, +: under focus) | Properties of grain-oriented electrical steel sheet: Iron loss $W_{17/50}$ (W/kg) | Properties of grain-oriented electrical steel sheet: Magnetic flux density $B_8$ (T) | Signal intensity ratio | Remarks |
|---|---|---|---|---|---|---|---|---|---|---|
| 1 | A | Electron beam | 4 | 480 | 32 | 1.00 | 0.78 | 1.93 | 1.05 | Comparative example |
| 2 | | Electron beam | 4 | 480 | 32 | 0.50 | 0.75 | 1.93 | 1.1 | Comparative example |
| 3 | | Electron beam | 4 | 480 | 32 | 0.22 | 0.74 | 1.93 | 1.18 | Comparative example |
| 4 | | Electron beam | 4 | 480 | 32 | 0.21 | 0.71 | 1.93 | 2.1 | Example |
| 5 | | Electron beam | 4 | 480 | 32 | 0.15 | 0.69 | 1.93 | 2.8 | Example |
| 6 | | Electron beam | 4 | 480 | 32 | 0.10 | 0.68 | 1.93 | 3.1 | Example |
| 7 | | Electron beam | 4 | 480 | 32 | 0.05 | 0.68 | 1.93 | 3.5 | Example |
| 8 | | Electron beam | 4 | 480 | 32 | 0.00 | 0.73 | 1.93 | 1.12 | Comparative example |
| 9 | | Electron beam | 4 | 480 | 32 | −0.05 | 0.76 | 1.93 | 1.08 | Comparative example |
| 10 | | Electron beam | 4 | 480 | 32 | −0.15 | 0.80 | 1.93 | 1.03 | Comparative example |
| 11 | B | Electron beam | 4 | 480 | 32 | 1.00 | 0.80 | 1.96 | 1.02 | Comparative example |
| 12 | | Electron beam | 4 | 480 | 32 | 0.50 | 0.76 | 1.96 | 1.03 | Comparative example |
| 13 | | Electron beam | 4 | 480 | 32 | 0.22 | 0.74 | 1.96 | 1.1 | Comparative example |
| 14 | | Electron beam | 4 | 480 | 32 | 0.21 | 0.65 | 1.96 | 3.1 | Example |
| 15 | | Electron beam | 4 | 480 | 32 | 0.15 | 0.62 | 1.96 | 3.6 | Example |
| 16 | | Electron beam | 4 | 480 | 32 | 0.10 | 0.61 | 1.96 | 4.2 | Example |
| 17 | | Electron beam | 4 | 480 | 32 | 0.05 | 0.61 | 1.96 | 4.8 | Example |
| 18 | | Electron beam | 4 | 480 | 32 | 0.00 | 0.68 | 1.96 | 1.18 | Comparative example |
| 19 | | Electron beam | 4 | 480 | 32 | −0.05 | 0.80 | 1.96 | 1.05 | Comparative example |
| 20 | | Electron beam | 4 | 480 | 32 | −0.15 | 0.83 | 1.96 | 1.03 | Comparative example |
| 21 | A | Laser beam | 8 | 2000 | 150 | 1.00 | 0.82 | 1.92 | 1.04 | Comparative example |

TABLE 2-continued

| Condition No. | Steel sample No. | Strain introduction means | Irradiation interval in rolling direction (mm) | Beam output (W) | Beam scanning rate (m/s) | Focal position (mm) with reference to irradiation surface (−: upper focus, +: under focus) | Properties of grain-oriented electrical steel sheet: Iron loss $W_{17/50}$ (W/kg) | Magnetic flux density $B_8$ (T) | Signal intensity ratio | Remarks |
|---|---|---|---|---|---|---|---|---|---|---|
| 22 | | Laser beam | 8 | 2000 | 150 | 0.50 | 0.78 | 1.92 | 1.1 | Comparative example |
| 23 | | Laser beam | 8 | 2000 | 150 | 0.22 | 0.77 | 1.92 | 1.19 | Comparative example |
| 24 | | Laser beam | 8 | 2000 | 150 | 0.21 | 0.74 | 1.92 | 1.8 | Example |
| 25 | | Laser beam | 8 | 2000 | 150 | 0.15 | 0.73 | 1.92 | 2.5 | Example |
| 26 | | Laser beam | 8 | 2000 | 150 | 0.10 | 0.72 | 1.92 | 2.7 | Example |
| 27 | | Laser beam | 8 | 2000 | 150 | 0.05 | 0.72 | 1.92 | 2.8 | Example |
| 28 | | Laser beam | 8 | 2000 | 150 | 0.00 | 0.75 | 1.92 | 1.2 | Comparative example |
| 29 | | Laser beam | 8 | 2000 | 150 | −0.05 | 0.79 | 1.92 | 1.1 | Comparative example |
| 30 | | Laser beam | 8 | 2000 | 150 | −0.15 | 0.81 | 1.92 | 1.06 | Comparative example |
| 31 | B | Laser beam | 8 | 2000 | 150 | 1.00 | 0.78 | 1.94 | 1.03 | Comparative example |
| 32 | | Laser beam | 8 | 2000 | 150 | 0.50 | 0.71 | 1.94 | 1.17 | Comparative example |
| 33 | | Laser beam | 8 | 2000 | 150 | 0.22 | 0.70 | 1.94 | 1.19 | Comparative example |
| 34 | | Laser beam | 8 | 2000 | 150 | 0.21 | 0.66 | 1.94 | 2.8 | Example |
| 35 | | Laser beam | 8 | 2000 | 150 | 0.15 | 0.65 | 1.94 | 3.5 | Example |
| 36 | | Laser beam | 8 | 2000 | 150 | 0.10 | 0.64 | 1.94 | 4.0 | Example |
| 37 | | Laser beam | 8 | 2000 | 150 | 0.05 | 0.64 | 1.94 | 4.4 | Example |
| 38 | | Laser beam | 8 | 2000 | 150 | 0.00 | 0.68 | 1.94 | 1.19 | Comparative example |
| 39 | | Laser beam | 8 | 2000 | 150 | −0.05 | 0.79 | 1.94 | 1.05 | Comparative example |
| 40 | | Laser beam | 8 | 2000 | 150 | −0.15 | 0.82 | 1.94 | 1.03 | Comparative example |

"Signal intensity ratio" represents the value obtained by dividing the intensity level of the total leakage magnetic flux by the intensity level of the magnetic flux leaked due to causes other than strain for the magnetic flux leaked from the local strain introduction portion.

"Focal point" represents the position where the beam diameter is minimized over the entire irradiation width.

Example 2

Steel slabs containing the components of Steel sample No. A listed in Table 1 with the balance being Fe and inevitable impurities were prepared by continuous casting, heated to 1400° C., and hot rolled to obtain a hot-rolled sheet having a thickness of 2.4 mm, and then subjected to hot-rolled sheet annealing at 1000° C. for 30 seconds. Then, each resulting sheet was cold rolled to an intermediate thickness of 1.0 mm, and intermediate annealing was carried out under a set of conditions including an oxidation degree of $PH_2O/PH_2=0.30$, a temperature of 1050° C., and a duration of 30 seconds. Thereafter, the subscale on the surface was removed by pickling with hydrochloric acid, and then cold rolling was performed again to produce a cold-rolled sheet having a thickness of 0.27 mm.

Figure 7A:
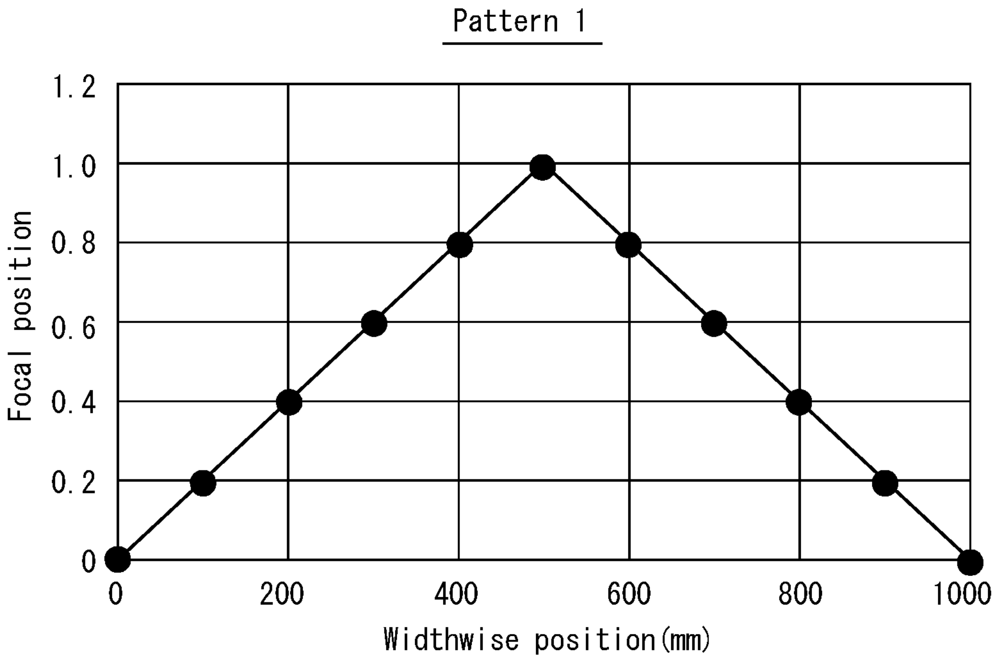
FIG. 7A is a graph illustrating a pattern of focal positions relative to widthwise positions.
Figure 7B:
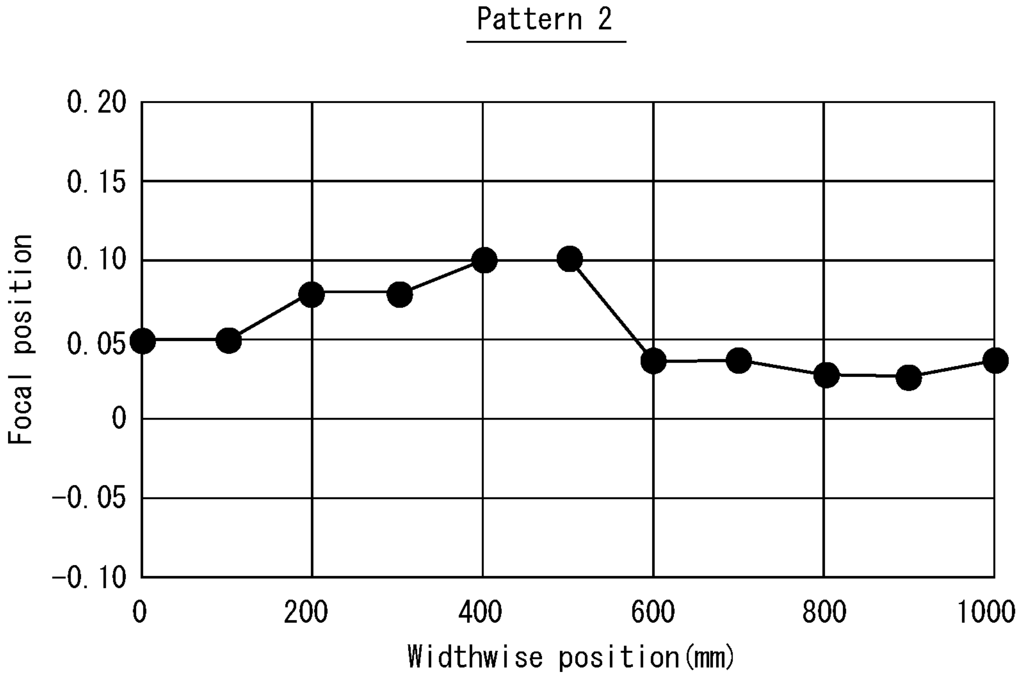
FIG. 7B is a graph illustrating another pattern of focal positions relative to widthwise positions.
Figure 7C:
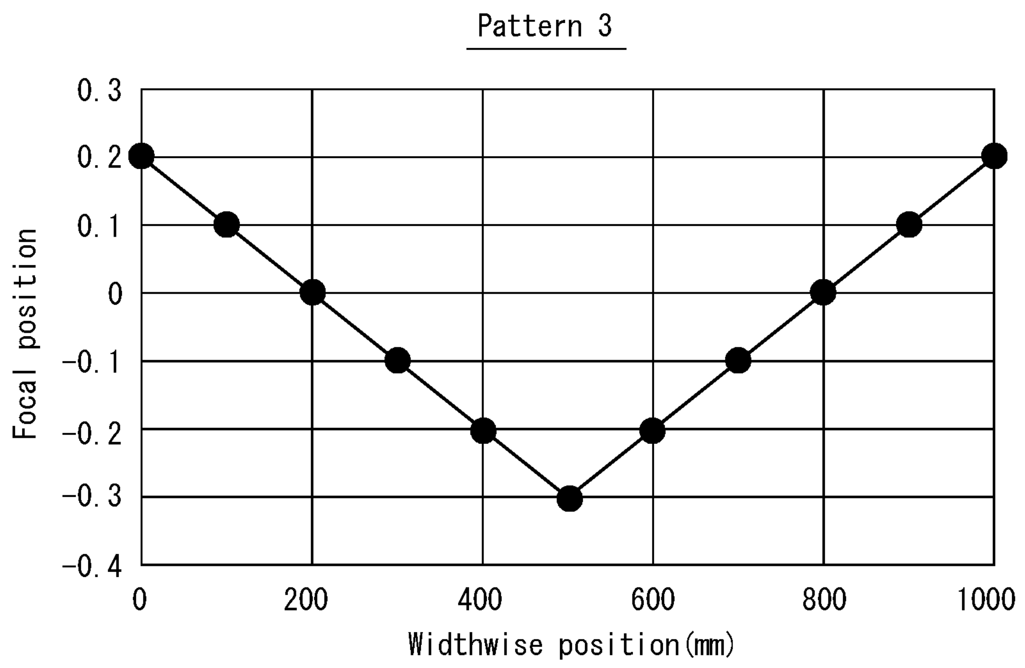
FIG. 7C is a graph illustrating another pattern of focal positions relative to widthwise positions.
Figure 7D:
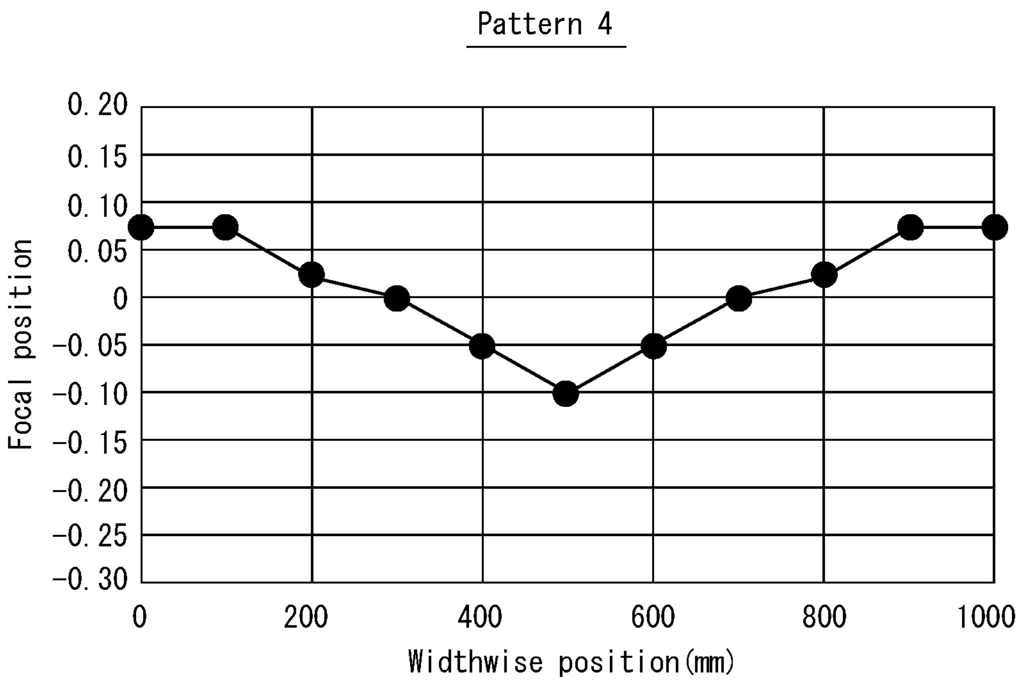
FIG. 7D is a graph illustrating another pattern of focal positions relative to widthwise positions.
Figure 7E:
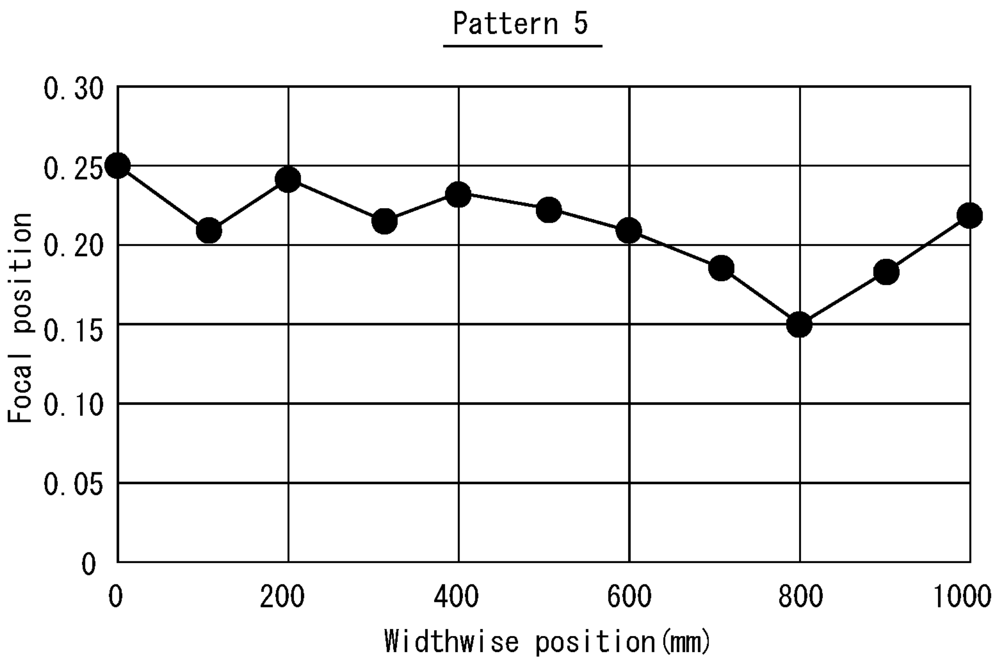
FIG. 7E is a graph illustrating another pattern of focal positions relative to widthwise positions.
Figure 7F:
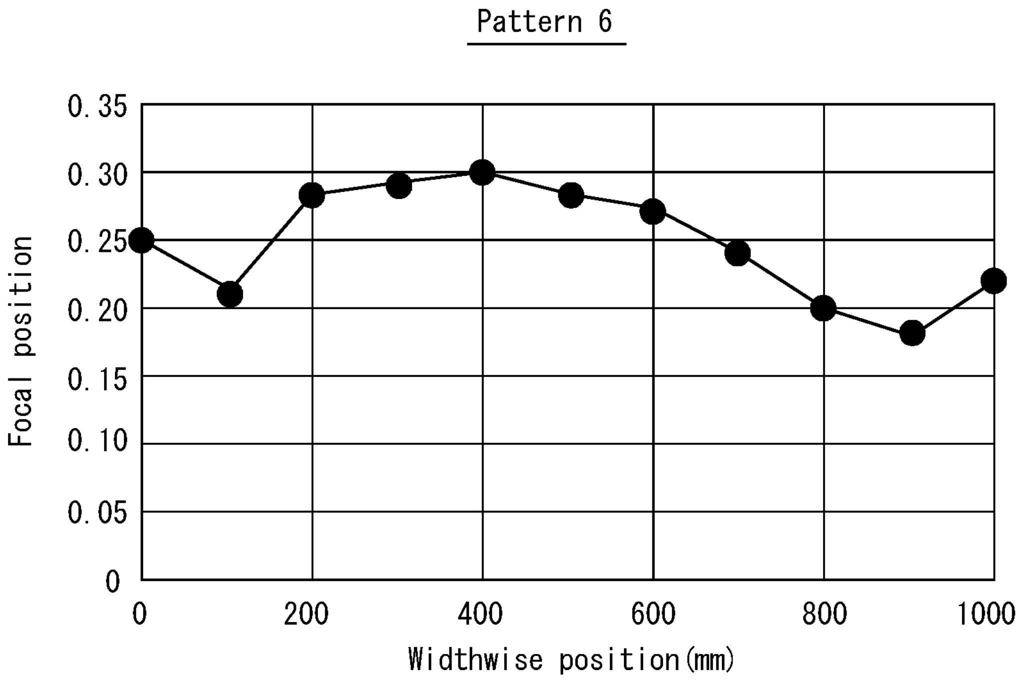
FIG. 7F is a graph illustrating another pattern of focal positions relative to widthwise positions.

Each cold-rolled sheet was then subjected to decarburization annealing in which it was held at a soaking temperature of 820° C. for 120 seconds, then applied with an annealing separator mainly composed of MgO, and then subjected to final annealing at 1180° C. for 50 hours intended for secondary recrystallization, forsterite film formation, and purification. After removing any unreacted annealing separator, a coating liquid containing 50% of colloidal silica and aluminum phosphate was applied, and tension coating baking treatment (baking temperature: 880° C.) also serving as flattening annealing was performed. Then, magnetic domain refining treatment was performed on one surface of each steel sheet, where the surface was irradiated with an electron beam in a direction perpendicular to the rolling direction. The focal position was varied in the widthwise direction of the steel sheet by continuously changing the focus coil. FIGS. 7A to 7F illustrate focal position Patterns 1 to 6 relative to widthwise positions. Other electron beam irradiation conditions are as listed in Table 3. The evaluation samples were taken from the entire irradiation width.

The obtained evaluation results (iron loss, magnetic flux density, and signal intensity ratio) are listed in Table 3. It can be seen that good iron loss properties were obtained in Pattern Nos. 2 and 5, which are within the range of the present disclosure, where the focal positions were above 0 across the entire width of the steel sheets and the signal intensity ratios were above 1.2. In contrast, the iron loss was larger in Pattern Nos. 1, 3, 4, and 6, which are outside the scope of the present disclosure, where the focal positions were 0 or less or the signal intensity ratios were 1.2 or lower, even partially in the width direction of the steel sheets.

TABLE 3

| Condition No. | Steel sample No. | Strain introduction means | Irradiation interval in rolling direction (mm) | Beam output (W) | Beam scanning rate (m/s) | Focal position pattern | Properties of grain-oriented electrical steel sheet: Iron loss $W_{17/50}$ (W/kg) | Magnetic flux density $B_8$ (T) | Signal intensity ratio | Remarks |
|---|---|---|---|---|---|---|---|---|---|---|
| 1 | A | Electron beam | 5 | 1500 | 90 | 1 (FIG. 7A) | 0.82 | 1.95 | 1.12 | Comparative example |
| 2 | | Electron beam | 5 | 1500 | 90 | 2 (FIG. 7B) | 0.76 | 1.95 | 4.2 | Example |
| 3 | | Electron beam | 5 | 1500 | 90 | 3 (FIG. 7C) | 0.84 | 1.95 | 1.02 | Comparative example |
| 4 | | Electron beam | 5 | 1500 | 90 | 4 (FIG. 7D) | 0.82 | 1.95 | 1.1 | Comparative example |
| 5 | | Electron beam | 5 | 1500 | 90 | 5 (FIG. 7E) | 0.79 | 1.95 | 2.4 | Example |
| 6 | | Electron beam | 5 | 1500 | 90 | 6 (FIG. 7F) | 0.81 | 1.95 | 1.15 | Comparative example |

"Signal intensity ratio" represents the value obtained by dividing the intensity level of the total leakage magnetic flux by the intensity level of the magnetic flux leaked due to causes other than strain for the magnetic flux leaked from the local strain introduction portion.
"Focal point" represents the position where the beam diameter is minimized over the entire irradiation width.

The invention claimed is:

1. A grain-oriented electrical steel sheet comprising a plurality of magnetic domains refined via a local strain introduction portion, wherein when a direct-current external magnetic field is applied to the steel sheet in a rolling direction, for a magnetic flux leaked from the local strain introduction portion at a position 1.0 mm away from an irradiation surface, a value obtained by dividing an intensity level of a total leakage magnetic flux by an intensity level of a magnetic flux leaked due to causes other than strain is more than 1.2.

2. The grain-oriented electrical steel sheet according to claim 1, wherein a magnetic flux density $B_8$ is 1.94 T or more.

3. A method of producing the grain-oriented electrical steel sheet as recited in claim 1, comprising: subjecting a grain-oriented electrical steel sheet to final annealing; and then applying magnetic domain refining treatment to a surface of the steel sheet by irradiation with an electron beam while adjusting focusing of the electron beam such that a focal position, which means a position where a beam diameter of the electron beam is minimized over an entire irradiation width, is always located inside the steel sheet in a thickness direction.

4. A method of producing the grain-oriented electrical steel sheet as recited in claim 2, comprising: subjecting a grain-oriented electrical steel sheet to final annealing; and then applying magnetic domain refining treatment to a surface of the steel sheet by irradiation with an electron beam while adjusting focusing of the electron beam such that a focal position, which means a position where a beam diameter of the electron beam is minimized over an entire irradiation width, is always located inside the steel sheet in a thickness direction.

5. A method of producing the grain-oriented electrical steel sheet as recited in claim 1, comprising: subjecting a grain-oriented electrical steel sheet to final annealing; and then applying magnetic domain refining treatment to a surface of the steel sheet by irradiation with a laser beam while adjusting focusing of the laser beam such that a focal position, which means a position where a beam diameter of the laser beam is minimized over an entire irradiation width, is always located inside the steel sheet in a thickness direction.

6. A method of producing the grain-oriented electrical steel sheet as recited in claim 2, comprising: subjecting a grain-oriented electrical steel sheet to final annealing; and then applying magnetic domain refining treatment to a surface of the steel sheet by irradiation with a laser beam while adjusting focusing of the laser beam such that a focal position, which means a position where a beam diameter of the laser beam is minimized over an entire irradiation width, is always located inside the steel sheet in a thickness direction.

7. The method of producing the grain-oriented electrical steel sheet according to claim 3, wherein the focal position is set in a region from inside an irradiation surface to mid thickness of the steel sheet.

8. The method of producing the grain-oriented electrical steel sheet according to claim 4, wherein the focal position is set in a region from inside an irradiation surface to mid thickness of the steel sheet.

9. The method of producing the grain-oriented electrical steel sheet according to claim 5, wherein the focal position is set in a region from inside an irradiation surface to mid thickness of the steel sheet.

10. The method of producing the grain-oriented electrical steel sheet according to claim 6, wherein the focal position is set in a region from inside an irradiation surface to mid thickness of the steel sheet.

* * * * *